United States Patent
Plotkin (10) Patent No.: US 10,157,088 B2
(45) Date of Patent: *Dec. 18, 2018

(54) ACTIVITY INTERRUPTION MANAGEMENT

(71) Applicant: Yagi Corp., Barre, MA (US)

(72) Inventor: Robert Plotkin, Barre, MA (US)

(73) Assignee: Yagi Corp., Barre, MA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/200,771

(22) Filed: Jul. 1, 2016

(65) Prior Publication Data

US 2016/0314028 A1    Oct. 27, 2016

Related U.S. Application Data

(63) Continuation of application No. 14/753,558, filed on Jun. 29, 2015, now Pat. No. 9,384,038, which is a continuation of application No. 14/359,048, filed as application No. PCT/US2014/020195 on Mar. 4, 2014, now Pat. No. 9,069,604.

(60) Provisional application No. 61/771,968, filed on Mar. 4, 2013.

(51) Int. Cl.
| | |
|---|---|
| *G06F 9/46* | (2006.01) |
| *G06F 9/54* | (2006.01) |
| *G06F 9/44* | (2018.01) |
| *G06F 9/48* | (2006.01) |
| *G06Q 10/10* | (2012.01) |

(52) U.S. Cl.
CPC ............... *G06F 9/542* (2013.01); *G06F 9/44* (2013.01); *G06F 9/48* (2013.01); *G06Q 10/1093* (2013.01)

(58) Field of Classification Search
CPC .. G06F 9/542; G06F 9/48; G06F 9/44; G06Q 10/1093
See application file for complete search history.

(56) References Cited

U.S. PATENT DOCUMENTS 4,979,047 A * 12/1990 Wine ..................... H04B 1/202
348/569
5,335,798 A *  8/1994 Bonwell ................. A47K 1/09
211/65

(Continued)

OTHER PUBLICATIONS

Krall, Michael A., "Clinicians' assessments of outpatient electronic medical record alert and reminder usability and usefulness requirements a qualitative study". Scholar Archive. 193. (Year: 2002).*

(Continued)

*Primary Examiner* — Adam Lee
(74) *Attorney, Agent, or Firm* — Blueshift IP, LLC; Robert Plotkin (57) ABSTRACT

In response to determining that an activity has been postponed (e.g., interrupted or deferred), a computer system stores a record indicating that the activity is postponed. In response to determining that another activity has become active, the computer system stores a record indicating that the other activity is active. The computer system reminds a user to return to the postponed activity in response to determining that a reminder condition associated with the postponed activity has been satisfied. For example, the computer system may remind the user to return to the postponed activity in response to determining that the other activity has been completed.

14 Claims, 5 Drawing Sheets

(56) References Cited

U.S. PATENT DOCUMENTS

| | | | | |
|---|---|---|---|---|
| 7,712,094 B2* | 5/2010 | Shapiro | G06F 8/61 | 705/59 |
| 9,384,038 B2 | 7/2016 | Plotkin | | |
| 2002/0107744 A1* | 8/2002 | Rosenberg | G07C 9/00111 | 705/18 |
| 2002/0174018 A1* | 11/2002 | Bunger | G06Q 20/20 | 705/26.8 |
| 2004/0061716 A1* | 4/2004 | Cheung | G06F 9/542 | 715/710 |
| 2005/0027669 A1* | 2/2005 | Day | G06Q 10/107 | |
| 2005/0246252 A1* | 11/2005 | Wallace | G06Q 20/10 | 705/30 |
| 2007/0004383 A1* | 1/2007 | Agozo | H04M 1/72566 | 455/414.1 |
| 2007/0129888 A1* | 6/2007 | Rosenberg | G01C 21/20 | 701/433 |
| 2008/0256445 A1* | 10/2008 | Olch | G06F 19/3418 | 715/700 |
| 2008/0270661 A1* | 10/2008 | Plumpton | G06F 13/24 | 710/262 |
| 2009/0094623 A1* | 4/2009 | Chakra | G06Q 10/109 | 719/329 |
| 2009/0276788 A1* | 11/2009 | Homma | H04N 19/159 | 718/107 |
| 2010/0080363 A1* | 4/2010 | Lesher | H04M 1/642 | 379/88.19 |
| 2010/0246785 A1* | 9/2010 | Wang | H04M 1/72583 | 379/88.23 |
| 2010/0246791 A1* | 9/2010 | Wang | H04M 3/42195 | 379/201.02 |
| 2010/0271202 A1* | 10/2010 | Lin | B60R 25/00 | 340/540 |
| 2010/0273447 A1* | 10/2010 | Mann | H04M 1/72519 | 455/405 |
| 2011/0314124 A1* | 12/2011 | Gimson | G06F 9/485 | 709/217 |
| 2012/0054095 A1* | 3/2012 | Lesandro | G06Q 20/10 | 705/39 |
| 2012/0245447 A1* | 9/2012 | Karan | A61B 5/14532 | 600/365 |
| 2012/0253485 A1* | 10/2012 | Weast | G06F 1/163 | 700/91 |
| 2012/0303421 A1* | 11/2012 | Yokoi | G06Q 10/06398 | 705/7.42 |
| 2013/0067475 A1* | 3/2013 | Singh | G06F 1/3203 | 718/100 |
| 2013/0254711 A1* | 9/2013 | Sievert | G06F 11/3072 | 715/810 |

OTHER PUBLICATIONS

Schulze, Hendrik. "MEMOS: An Interactive Assistive System for Prospective Memory Deficit Compensation". ASSETS'04, Proceedings of the 6th international ACM SIGACCESS conference on Computers and accessibility. pp. 79-85. Oct. 18-20, Atlanta, Georgia, USA. (Year: 2004).*

Richard, Nadine, and Seiji Yamada. "Context-awareness and user feedback for an adaptive reminding system." Proceedings of the 2nd Workshop on Artificial Intelligence Techniques for Ambient Intelligence (AITAml'07), Hyderabad, India. (Year: 2007).*

Richard, Nadine, and Seiji Yamada. "An Adaptive, Emotional, and Expressive Reminding System." AAAI Spring Symposium: Interaction Challenges for Intelligent Assistants. (Year: 2007).*

* cited by examiner

ACTIVITY INTERRUPTION MANAGEMENT

BACKGROUND

Performing certain procedures, such as executing the steps in a pre-flight takeoff checklist in an airplane cockpit, require concentration to complete successfully. Interruptions, such as a request from the tower to perform a task unrelated to the procedure currently being performed, can result in errors, such as failure to return to the interrupted procedure, skipping one or more steps in the interrupted procedure, or performing one or more steps in the interrupted procedure multiple times. Such problems, which can cause significant harm, can occur even if those executing the procedure are not operating under conditions of information overload. Instead, in some circumstances even a single, simple interruption can result in a significant error even if those performing the procedure are not otherwise distracted or overwhelmed.

SUMMARY

In response to determining that an activity has been postponed (e.g., interrupted or deferred), a computer system stores a record indicating that the activity is postponed. In response to determining that another activity has become active, the computer system stores a record indicating that the other activity is active. The computer system reminds a user to return to the postponed activity in response to determining that a reminder condition associated with the postponed activity has been satisfied. For example, the computer system may remind the user to return to the postponed activity in response to determining that the other activity has been completed.

DETAILED DESCRIPTION

Figure 1:
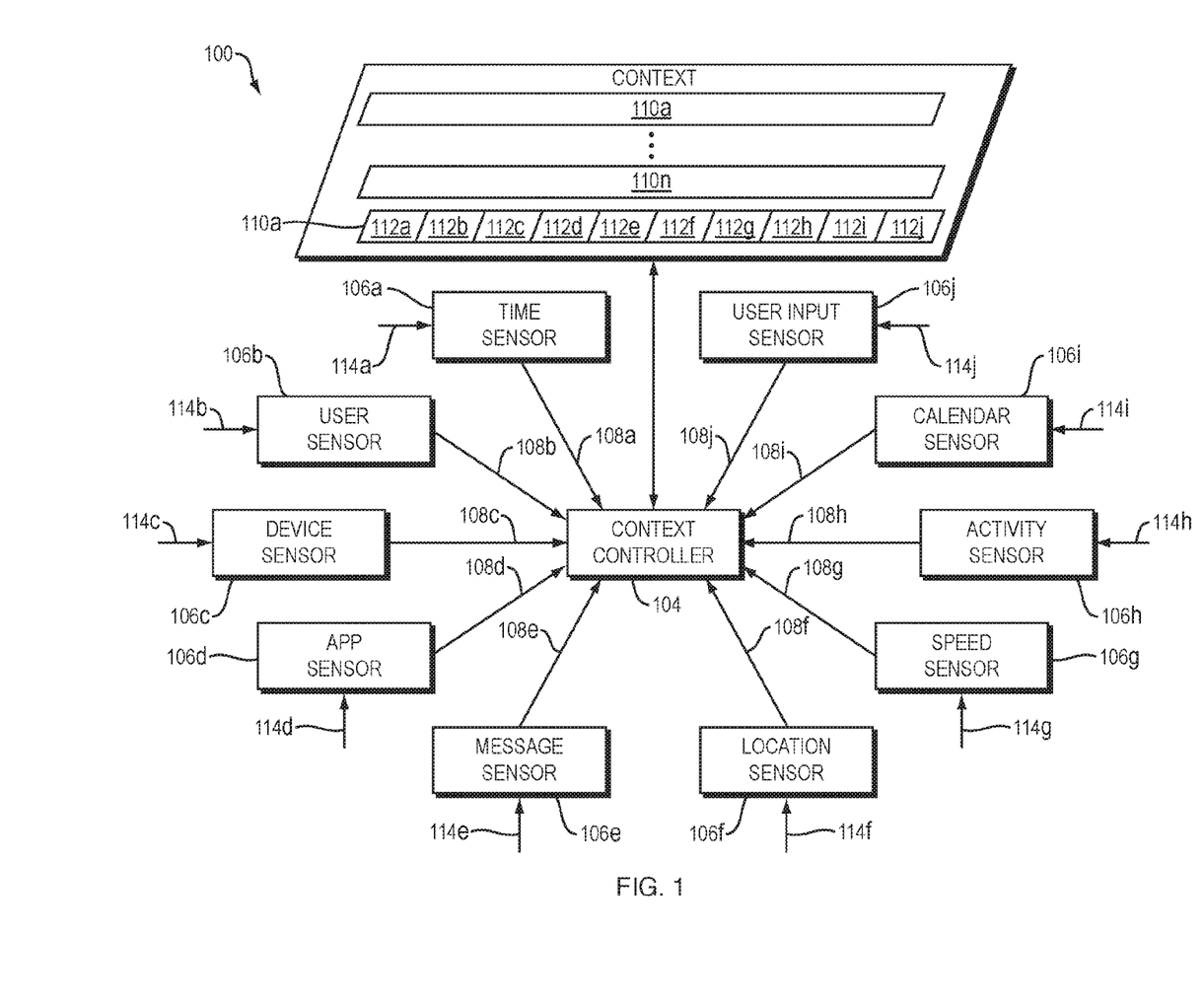
FIG. 1 is a diagram of a context controller for obtaining and synthesizing context data according to one embodiment of the present invention.

Referring to FIG. 1, a dataflow diagram is shown of a system 100 for obtaining and storing context data 102. Context data 102 is also referred to herein as "context." Context data 102 may, for example, represent information about an activity currently engaged in by one of the users 122$a$-$b$ of the system 100, information about appointments on a user's calendar, or information about messages currently being transmitted by the system 100.

The system 200 includes a plurality of context sensors 106$a$-$j$. In general context sensors 106$a$-$j$ obtain sensor inputs 114$a$ j, respectively, and generate outputs 108$a$-$j$, respectively. The outputs 108$a$-$j$ of context sensors 106$a$-$j$ are provided to and received by context controller 104, which generates and stores context data 102 based on the received outputs 108$a$ j. Context data 102 may, for example, include a context data record 110$a$, which includes fields 112$a$-$j$ corresponding to and representing sensor outputs 108$a$-$j$, respectively. More specifically, field 112$a$ may represent sensor output 108$a$, field 112$b$ may represent sensor output 108$b$, and so on.

Although not shown in FIG. 1, context controller 104 may be used to read the context data 102. For example, context controller 104 may provide output representing some or all of context data 102, e.g., in response to a request from another component for such data. Furthermore, context controller 104 may receive a request from another component to modify some or all of context data 102 and, in response to such a request, may make the requested modification to the context data 102.

Context controller 104 may sample the outputs 108$a$-$j$ repeatedly, e.g., periodically (e.g., every millisecond, every second, or every minute), or in response to detecting a change in one or more of the outputs 108$a$ j. The context controller 104 may generate and store multiple context data records 110$a$-$n$, each of which represents a distinct sample of some or all of the sensor outputs 108$a$-$j$. Such repeated sampling and storage may, for example, be used to store a record of the history of context data generated by the context controller 104 within the context data 102 itself. Alternatively, for example, the context controller 104 may store only a single context data record 112$a$ within the context data 102, and overwrite the values in the context data record 112$a$ based on the outputs 108$a$-$j$ received most recently from the sensors 106$a$ j.

Each of the sensors 106$a$-$j$ may provide, as its output, an output that is identical to or a copy of the sensor's input, or an output that is generated based on the sensor's input but which differs from the sensor's input in any of a variety of ways, such as in its format and/or value. Furthermore, inputs 114$a$-$j$ are optional; they may be omitted from the system 100 or integrated into their corresponding sensors. Any one or more of the sensors 106$a$-$j$ may receive multiple inputs and derive output from such multiple inputs in any way.

Sensor 106$a$ is a time sensor, which receives time sensor input 114$a$, such as data generated by a clock representing a current time. Time sensor 106$a$ may, for example, generate output 108$a$ representing a current time (e.g., the time at or around the time at which the sensor output 108$a$ is generated). Such a time may be any kind of time, such as a real time (e.g., Jan. 1, 2011 at 11:00 AM) or a system time (e.g., a number of clock cycles since a device was booted), represented to any degree of accuracy.

Storing a value that is equal to or based on the time sensor output 108$a$ in the context records 110$a$-$n$ effectively marks such records with timestamps that may later be used to associate any particular record with the time stored in the record's time field 112$a$, which may represent the actual or approximate time at which the record was created. The context controller 104 may sample all of the sensor outputs 108$a$-$j$ at or near the time represented by the time sensor output 108$a$ and generate a corresponding context record based on such sampled outputs, so that each of the context records 110$a$-$n$ generated by the context controller 104$a$ contains data representing context information that is valid for a single point in time or a relatively short period of time overlapping with or near the time represented by the record's time field 112*a*, and so that the record's time field 112*a* may subsequently be used to identify the actual or approximate time(s) for which the information represented by the other fields 112*b-i* in the same record is valid.

Any references below to the "current sample period" in connection with the set of sensor outputs 108*a-j* therefore refers to a point in time or period of time defined by reference to the time represented by time sensor output 108*a*, such as the exact point in time represented by time sensor output 108*a* or a time period beginning with or otherwise including the point in time represented by time sensor output 108*a*. Similarly, any use of the terms "current" or "currently" below should be understood to refer to a time or time period defined by reference to the time represented by the time sensor output 108*a*. For example, in the context of a particular set of sensor outputs 108*a-j* within the current sample period, "the current user" should be understood to refer to the user represented by output 108*b* of user sensor 106*b* at or around the time represented by time sensor output 108*a*.

Sensor 106*b* is a user sensor, which receives user sensor input 114*b* and generates, based on input 114*b*, output 108*b* representing a user, such as a current user of one of the devices 124*a-c* or the system 100 as a whole. The sensor 106*b* may, for example, obtain input 114*b* representing user login credentials (e.g., username and/or password) or biometric information, and provide user output 108*b* uniquely identifying the user specified by the input to the sensor 106*b*. The user output 108*b* is not limited to output representing the identity of the user, but more generally may represent any data relating to the user.

Sensor 106*c* is a device sensor, which receives device input 114*c* and generates, based on input 114*c*, output 108*c* representing a device, such as one of the devices 124*a-c* of the system 100. The device output 108*c* during a particular sample period may, for example, represent a device currently used by the user represented by the output 108*b* of user identification sensor 106*b* during the sample period. The device sensor 106*c* may, for example, obtain input 114*c* representing a device serial number or other unique identifier of the device, and provide device output 108*c* uniquely identifying the device. The device output 108*c* is not limited to output representing the identity of the device, but more generally may represent any data relating to the device, such as data representing any aspect of the device's current configuration, such as audio volume, screen brightness, and whether any particular input or output components of the device currently are enabled or disabled.

Sensor 106*d* is an application sensor, which receives application input 114*d* and generates, based on input 114*d*, output 108*d* representing the state of one or more software applications (which includes any kind of software, such as operating systems, application programs, and web-based applications). For example, the application sensor output 108*d* during a particular sample period may, for example, represent the state of one or more software applications executing on a device. The application output 108*d* during a particular sample period may, for example, represent the state of one or more software applications executing on the device represented by the output 108*c* of device sensor 106*c*, or the state of one or more software applications being executed by or on behalf of the user represented by the output 108*b* of the user sensor 106*b*, during the same sample period. The application sensor output 108*d* may, for example, indicate which applications currently are executing, which application(s) is/are in the foreground, which application has the input focus, which application(s) currently is/are providing user output, and which application(s) currently is/are receiving user input. The application sensor 106*d* may obtain input 114*d* from any source, such as an operating system of the device represented by device sensor output 108*c*, or from applications by using application program interface (API) calls to such applications.

Sensor 106*e* is a message sensor, which receives message input 114*e* and, based on input 114*e*, generates output 108*e* representing information relating to one or more messages. Output 108*e* may, for example, represent a communication mode of the message (e.g., whether the message is an email message, a text message, or a live voice call), data from the message (such as the body of an email message, audio from a voice call, or text transcribed from a voice message), metadata of the message (such as a message header or metatag), the composition state of the message (e.g., whether the message currently is being composed or has already been composed), the manifestation state of the message (e.g., whether the message currently is being manifested), the transmission state of the message (e.g., whether the message currently is queued for transmission, attempted to be transmitted, or being transmitted), and the transmission direction of the message (e.g., whether the message currently is being sent or received by the user, device, or application represented by output 108*b*, 108*c*, or 108*d*, respectively). The message sensor 106*e* may obtain input 114*e* from any source, such as an operating system of the device represented by device sensor output 108*c* or by using application program interface (API) calls to individual applications.

Sensor 106*f* is a location sensor, which receives location input 114*f* and, based on input 114*f*, generates output 108*f* representing information relating to a current location of either or both of the user represented by user output 108*b* and the device represented by device output 108*c*. The location sensor 106*f* may obtain input 114*f* from any source, such as a Global Positioning System (GPS) device, a radio frequency identification (RFID) tag, or manual user input. The location sensor output 108*f* may represent the current location in any of a variety of forms, such as a latitude-longitude combination, or by one or more labels representing one or more categories of location (e.g., work, home, theater, restaurant). The location sensor 106*f* may, alternatively or additionally, obtain input 114*f* relating to and provide output 108*f* representing the proximity of the user and/or device to another user and/or device. Proximity data may, for example, be received directly from another device using infrared (IR) signals, or by comparing locations of user or devices to each other. Proximity output 108*f* may represent, for example, any one or more of the following: the degree of proximity (e.g., distance) to another device, the identity of the proximate device, and whether the device represented by device output 108*c* is proximate to another device of interest.

Sensor 106*g* is a velocity sensor, which generates output 108*g* representing information relating to a current velocity of either or both of the user represented by user output 108*b* and the device represented by device output 108*c*. The velocity sensor 106*g* may obtain data from any source, such as any of the sources from which the location sensor 106*f* may obtain data. The velocity sensor 106*g* may, alternatively or additionally, obtain data relating to and provide output 108*g* representing the current acceleration of the current user and/or the current device.

Sensor 106*h* is an activity sensor, which receives activity input 106*h* and, based on input 106*h*, generates output 108*h* representing information relating to a current activity in which the current user and/or the current device is engaged. Examples of activities are writing a message, reading a message, writing a document, reading a document, engaging in a voice call, listening to a voice message, and providing input of any kind to the current device. The activity sensor 106*h* may obtain input 114*h* from any source, such as from any user input device (e.g., keyboard, mouse, touchpad, touchscreen, or microphone) or by making API calls to software such as operating systems, application programs, and device drivers.

Sensor 106*i* is a calendar sensor, which receives calendar input 114*i* and, based on input 114*i*, generates output 108*i* representing information relating to data stored in a calendar of the current user and/or a calendar of the current device. Calendar output 108*i* may represent, for example, the presence or absence of an appointment at or near the current time, and any information relating to any appointment at or near the current time, such as the appointment's start time, end time, duration, location, priority (e.g., high or low), category, and attendee list.

The calendar sensor 106*i* may obtain calendar input 114*i* from any source, such as a calendar application external to the system 200 (e.g., Microsoft Outlook, Apple iCal, Google calendar), a calendar internal to the system 200, or a combination of both. The calendar sensor 106*i* may obtain calendar input 114*i* from external calendar applications using application program interfaces (APIs) provided by such external calendar applications. In some embodiments, the calendar sensor 106*i* solely obtains calendar input 114*i* from one or more sources external to the system 200, in which case the system 200 may not create or edit data within the calendars maintained by such external sources.

In embodiments that use both a calendar internal to the system and one or more external calendars, such internal and external calendars may interact with each other in a variety of ways. For example, the internal calendar may override the external calendars in the case of a conflict between the two, or vice versa. As another example, the internal calendar may be combined with the external calendars, such as by aggregating the appointments on the internal calendar and external calendar into a single combined calendar.

As mentioned above, the time sensor 106*a* may implement various functions related to timers. Such functions may be implemented, either alternatively or additionally, by the calendar sensor 106*i*. A condition of a logic module may define a particular timer, and the condition may be satisfied when the particular timer has expired, or when the particular timer has started running but not yet expired. The condition may, for example, specify a time at which the timer is to start running (such as by defining a condition, upon satisfaction of which the timer is to start running). Alternatively, for example, the timer may be started in response to user input at a user-selected time.

A timer is associated with a start time and either a duration or an end time. Although at least some timers may be implemented in the same way as calendar appointments, timers need not be implemented as calendar appointments. For example, a timer may be started at any time without adding an entry representing the timer to a calendar. Furthermore, a timer associated with a duration may be started and stopped any number of times. When the timer is first started (the timer's "initial start time"), the timer's "running time" may be initialized to zero and begin to accumulate in real time (i.e., to accumulate one second of running time for each second of real time). The timer's running time may stop accumulating if and in response to stopping the timer. If the timer is started again, the timer's running time may resume its real-time accumulation. The timer may only expire when its running time equals or exceeds its associated duration. Some timers may not be allowed to be stopped once they have started, in which case the timer's running time may be equal to the amount of real time that has elapsed since the timer's initial start time.

The total running time of a timer may be reset (e.g., to zero or some other number) upon the satisfaction of a condition. For example, the total running time of a timer may be reset after some predetermined amount of real time has elapsed since the timer's initial start time, since the timer was last reset (e.g., one minute, one hour, one day, or one week), or upon the occurrence of a real time that satisfies a condition (e.g., the beginning of a new calendar minute, hour, day, or week). Such timers may only expire if their total running time equals or exceeds their associated duration before they are reset.

Figure 2:
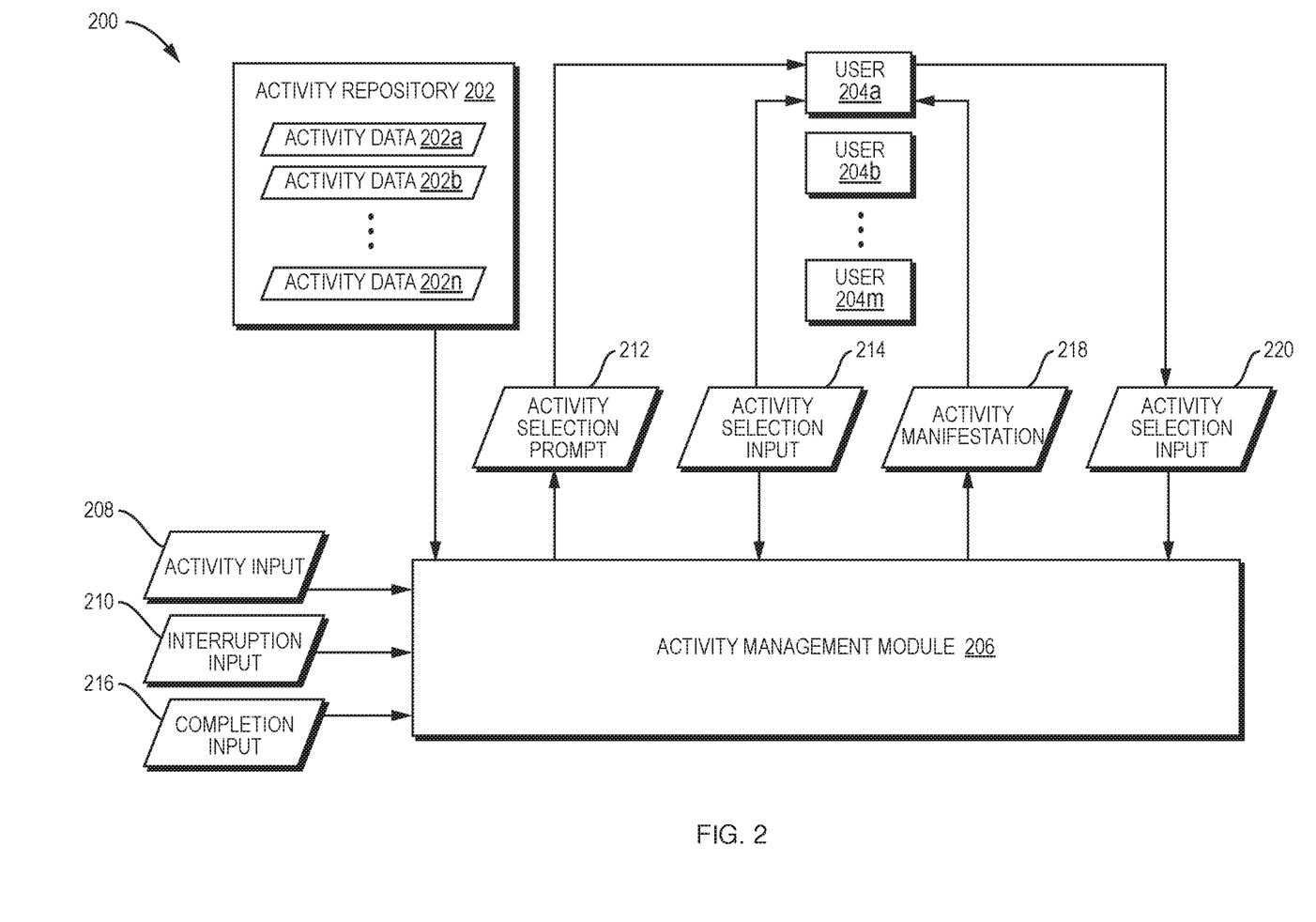
FIG. 2 is a dataflow diagram of a system for managing interruptions of activities performed by users according to one embodiment of the present invention.
Figure 3:
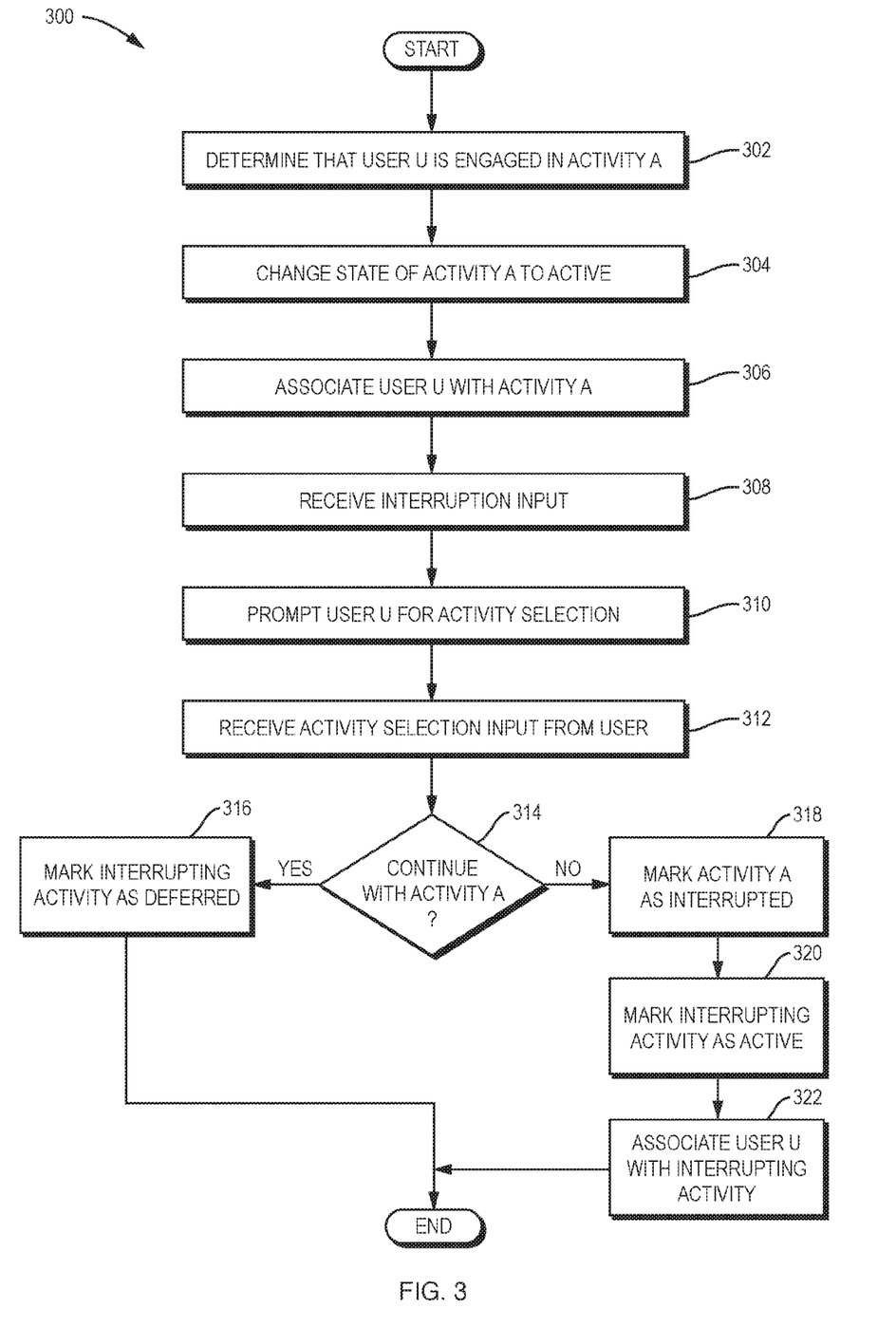
FIG. 3 is a flowchart of a method performed by the system of FIG. 2 according to one embodiment of the present invention.

Certain embodiments of the present invention include techniques for managing interruptions of activities performed by users. For example, referring to FIG. 2, a dataflow diagram is shown of a system 200 for managing interruptions of activities performed by users 204*a-m* according to one embodiment of the present invention. Referring to FIG. 3, a flowchart is shown of a method 300 performed by the system 200 of FIG. 2 according to one embodiment of the present invention.

The system 200 includes an activity repository 202, which includes activity data records 202*a-n*, where n may be any number (e.g., 1, 2, 3, or more). Each of the activity data records 202*a-n* represents an activity that has been performed, is being performed, or will be performed by one or more of users 204*a-m*, where m may be any number (e.g., 1, 2, 3, or more).

Figure 4:
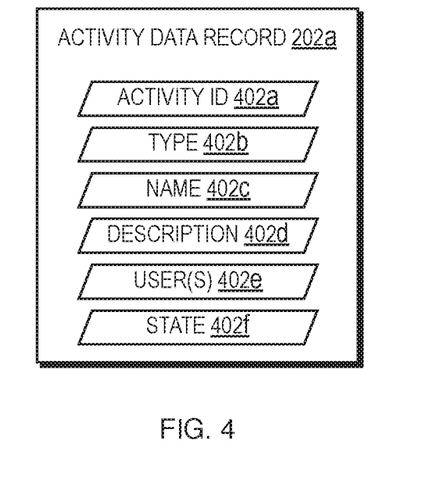
FIG. 4 is a diagram illustrating a data structure for storing data representing an activity according to one embodiment of the present invention.

Each of the activity data records 202*a-n* may store any of a variety of data associated with the corresponding activity. For example, referring to FIG. 4, an example of data that may be stored within activity data record 202*a* is shown. The particular data elements shown in FIG. 4 are merely examples and do not constitute limitations of the present invention. Furthermore, although activity data record 202*a* is shown in FIG. 4 for purposes of example, the other data records 202*b-n* may have the same or similar data structures as that shown in FIG. 4. As a result, the description herein of data stored in activity data record 202*a* is equally applicable to the other activity data records 202*b-n*.

The activity data record 202*a* may include the following data elements (e.g., fields in a database record):

An activity identifier (ID) field 402*a*, which may store an identifier of the activity data record 202*a* that is unique among the activity identifier fields of all of the activity data records 202*a-n*.

A type field 402*b*, which may store data representing a type (e.g., class) of the activity represented by the activity data record 202*a*. As one example, the type field 402*b* may store data representing a communication mode associated with the activity represented by the activity data record 202*a* (e.g., email message, text message, or voice call), whereby the type field 402*b* of different activity data records may have values representing different communication modes. As another example, if the activity represented by the activity data record 202*a* is a particular procedure (such as a particular medical procedure or a particular cockpit procedure), then the type field 402*b* may store data representing the type (e.g., class) of procedure, whereby the type field 402b of different activity data records may have values representing difference types of procedures.

A name field 402c, which may store data representing one or more names of the activity represented by the activity data record 202a, such as a text string representing a human-readable name of the activity (e.g., "Pre-Flight Takeoff Checklist" or "IV Checklist"). Activities represented by different activity data records may have the same or different names.

A description field 402d, which may store data representing a human-readable description of the activity represented by the activity data record 202a, such as a text string representing such a human-readable description. Different activities of the same type and having the same name may have different descriptions.

A user field 402e, which may store data representing one or more users associated with the activity represented by the activity data record 202a, such as one or more users who are assigned to perform the activity, who currently are performing the activity, who were interrupted while performing the activity, or who completed performing the activity. Although not shown in FIGS. 2-4, the system 200 may include a data record for each of one or more of the users 204a-m, in which case the user record for a particular user may include data representing the activity/activities associated with that user (such as any activities assigned to the user, activities currently being performed by the user, activities during the performance of which the user was interrupted, and activities that the user has completed performing).

A state field 402f, which may store any of a variety of data representing a state of the activity represented by the activity data record 202a. Examples of contents and uses of the state field 402f will be described in more detail below. By default, the value of the state field 402f of the activity data record 202a may be set to a value of "not started" upon creation of the activity data record.

The system 200 includes an activity management module 206, which receives activity input 208 and, based on the activity input 208, determines that a particular one or more users U are engaged in a particular activity (FIG. 3, operation 302). For example, the user(s) U may be any one or more of the users 204a-m in FIG. 2. For ease of explanation, the user(s) U may be referred to herein as "the" user U, but it should be appreciated that such references may apply to any number of users. The activity A may, for example, be any of the activities represented by the activity data records 202a-n. Furthermore, for purposes of illustration and not limitation, assume that in operation 302, the method 300 determines that user 204a is engaged in the activity represented by activity data record 202a.

The activity management module 206 may determine that the user U is engaged in activity A in any of a variety of ways. For example, the activity input 208 may consist of or include the context data 102 of FIG. 1, and the activity management module 206 may determine that user U is engaged in activity A based on the context data 102.

For example, the user U may provide some or all of the activity input 208 manually to the activity management module 206 to indicate expressly that user U currently (i.e., at the present time) is engaged in activity A. For example, user U may select an identifier of activity A from a menu or drop-down list, tap or click on a graphical representation of activity A, speak an identifier of activity A, indicate that the state of activity A should be changed to "active," or any combination thereof.

As another example, the activity management module 206 may infer or otherwise conclude, based on the activity input 208 (which may include some or all of the context data 102), that user U currently is engaged in activity A. For example, if activity A represents processing of a particular electronic checklist, and user U provides input (in activity input 208) to the electronic checklist (such as marking an element in the checklist as complete), then the activity management module 206 may determine that user U currently is engaged in activity A. As another example, if activity A represents responding to a particular communication (e.g., a particular email message, text message, or voice call), and the activity input 208 includes data indicating that user U is reading, listening to, or responding to the particular communication, then the activity management module 206 may determine that user U currently is engaged in activity A. More generally, if the activity management module 206 determines, based on the activity input 208, that user U is performing an action within activity A, then the activity management module 206 may determine that user U is engaged in activity A.

In response to determining that the user U (e.g., user 204a) is engaged in activity A (e.g., the activity represented by activity data record 202a), the method 300:

modifies the state field 402f of the activity data record 202a to indicate that the state of the corresponding activity A is "active" (FIG. 3, operation 304);

modifies the user field 402e of the activity data record 202a to indicate that the user U (e.g., user 204a) is associated with (e.g., currently performing) the corresponding activity A (FIG. 3, operation 306).

If the activity data record 202a does not exist at the commencement of operation 304, then operation 304 may include creating activity data record 202a. If the state of activity A is already "active" at the commencement of operation 304, then operation 304 may leave the state of activity A as "active." If user U is already associated with activity A at the commencement of operation 306, then the operation 306 may leave user U as associated with activity A.

The system 200 and method 300 may enforce a rule which prohibits any of the users 204a-m from being associated with more than one active activity simultaneously. Therefore, operation 306 may include: (1) determining whether user U is associated with any active activity (e.g., any activity whose state field 402f has a value of "active"); (2) if user U is associated with any active activity, changing the state of that active activity to "interrupted"; and (3) associating user U with activity A.

The active activities with which a user is associated at the current time are referred to as the user's "current activities." If the user is restricted to only being associated with one active activity at any particular time, then at any particular time the user has at most one current activity. As this implies, a user may not have a current activity (i.e., the user may be associated with zero active activities) at any particular time.

The activity management module 206 receives interruption input 210 (FIG. 3, operation 308). The activity management module 206 may receive the activity input 208 at a first time and receive the interruption input 210 at a second time that is later than the first time. Additionally or alternatively, each of the activity input 208 and the interruption input 210 may contain timing data (e.g., timestamps), in which case the timing data of the interruption input 210 may represent a later time than the timing data of the activity input 208.

The interruption input 210 may take any of a variety of forms. For example, the interruption input 210 may take any of the forms described herein for the activity input 208. The interruption input 210 may be any data that represents an opportunity for user U to engage in an "interrupting activity" B when activity B is not user U's current activity. The term "interrupting activity" is used herein in connection with a particular user U to refer to an activity in which user U is not currently engaged, and which presents an opportunity to be engaged in by user U. For example, user U may have no current activity, and the interruption input 210 may represent an opportunity for user U to engage in interrupting activity B. As another example, user U's current activity may be activity A, and the interruption input 210 may represent an opportunity for user U to engage in interrupting activity B (i.e., to change user U's current activity to activity B). For example, the activity management module 206 may determine, based on the activity input 208 and/or the interruption input 210, that an opportunity exists for the user U to engage in activity B.

The interruption input 210 may take any of a variety of forms, and the activity management module 206 may interpret the interruption input 210 in any of a variety of ways. For example, the interruption input 210 may represent:
 an incoming message (e.g., email message, text message, or voice call) addressed to user U;
 a request by another user for user U to engage in activity B (such as a request by the other user for user U to engage in a process associated with a particular checklist);
 manual input received from user U representing a desire to engage in activity B (such as any input selecting activity B);
 any data indicating that user U is engaged in activity B.

In response to receiving the interruption input 210 or otherwise concluding that the interruption input 210 represents an opportunity for user U to engage in activity B or that the interruption input 210 indicates that the user is engaged in activity B, the activity management module 206 may provide a prompt 212 to the user U (e.g., user 204a) for an activity selection (FIG. 3, operation 310). Note that operation 310 is optional and may be omitted from method 300. The prompt 212, when provided, may take any of a variety of forms. For example, the prompt 212 may provide the user 204a with two options: (1) continue performing the current activity A; or (2) switch to performing activity B. The prompt may, for example, be graphical (e.g., include buttons or other graphical user interface elements with labels such as "Continue with Activity A" and "Switch to Activity B") or auditory (e.g., the spoken words "Say 'A' to continue with Activity A; say 'B' to switch to activity B"). The prompt 212 may include data associated with each of the activities, such as any one or more of its type 402b, name 402c, and description 402d, to assist the user 204a in selecting an activity to perform.

The user 204a provides activity selection input 214 to the activity management module 206 (FIG. 3, operation 312). In general, the activity selection input 214 indicates the user's selection of an activity to perform, e.g., activity A or activity B. The activity selection input 214 may take any of a variety of forms, such as tapping or clicking on the graphical user interface elements in the prompt 212, speaking a voice command, or performing an action that is part of the selected activity.

The activity management module 206 determines whether the activity selection input 214 selects the current activity A or the interrupting activity B (FIG. 3, operation 314). If user U opts to continue performing activity A, then the state of activity A remains "active" and the activity management module 206 changes the value of the state field 402f of interrupting activity B to "deferred" (FIG. 3, operation 316). If user U opts to perform interrupting activity B, then the activity management module 206: (1) changes the value of the state field 402f of current activity A to "interrupted" (FIG. 3, operation 318); (2) changes the value of the state field 402f of interrupting activity B to "active" (FIG. 3, operation 320); and (3) changes the value of the user field 402e of interrupting activity B to include a reference to user U (e.g., user 204a) (FIG. 3, operation 322). The result is to make the interrupting activity B into user U's current activity. Note that if user U does not have any current activity upon commencement of operation 318, then operation 318 need not be performed.

Although the state field 402f values of "interrupted" and "deferred" are disclosed herein as two distinct values, this is merely an example and does not constitute a limitation of the present invention. Both such values may, for example, be implemented as a single value, such as "interrupted," "deferred," or "postponed," if it is not desired or necessary to draw a distinction between interruption and deferral.

Figure 5:
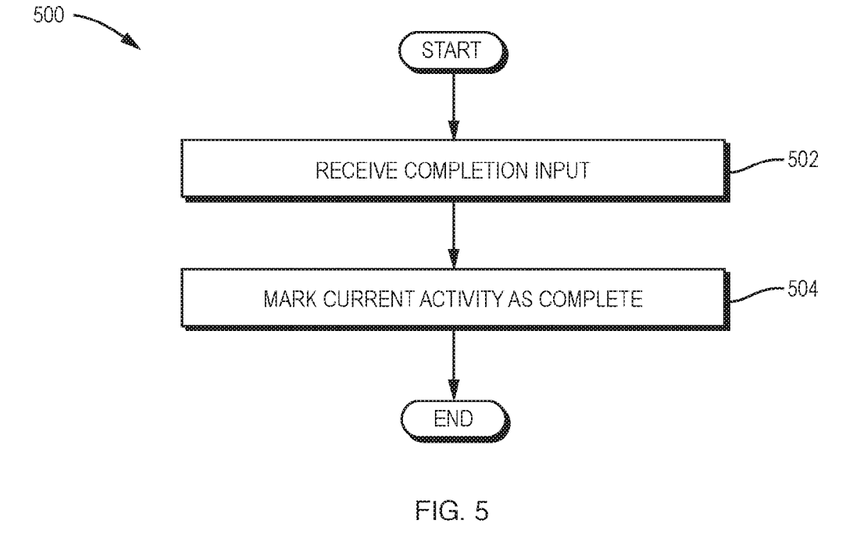
FIG. 5 is a flowchart of a method for marking an activity as complete according to one embodiment of the present invention.

Referring to FIG. 5, a flowchart is shown of a method 500 performed by the system 200 to mark an activity as complete according to one embodiment of the present invention. The activity management module 206 received completion input 216 (FIG. 5, operation 502). In general, the completion input 216 indicates that a particular activity A is complete. For example, the activity management module 206 may determine, based on the completion input 216, that activity A is complete. The completion input 216 may take any of a variety of forms. For example, the completion input 216 may take any of the forms described herein for the activity input 208.

As a particular example, if the current activity A of user U is processing of a checklist, then completion input 216 may indicate that all required elements (e.g., all elements) of the checklist have been marked as complete. As another example, if the current activity A of user A is responding to a message, then completion input 216 may indicate that user U has responded to the message. In the previous two examples of completion input 216, the activity management module 206 may, for example, determine automatically that activity A is complete, e.g., by determining based on input received from a checklist program that a checklist has been completed or based on input received from a messaging program that a message has been sent. As another example completion input 216 may consist of or include manual input from user U indicating that activity A is complete.

In response to receiving the completion input 216 or otherwise determining that activity A is complete, the activity management module 206 sets the value of the state field 402f of the activity data record representing activity A to a value of "complete" (FIG. 5, operation 504). As a result, activity A is no longer a current activity of user U. If activity A was user U's only current activity before the performance of operation 504, then upon completion of operation 504 user U has no current activity.

As previously indicated, a current activity A of user U may become interrupted (e.g., the value of the state field 402f of the current activity may change from "active" to "interrupted"), and the user U may then switch from engaging in current activity A to engaging in interrupting activity B, which may cause interrupting activity B to become a current activity of user U. Similarly, if the user U opts not to engage in the interrupting activity B immediately, then the interrupting activity B may be deferred (e.g., the value of the state field 402f of the interrupting activity B may change to "deferred"). At any given time, the user U may have zero, one, or more interrupted activities (i.e., activities that are associated with the user U and that have a state of "interrupted") and zero, one, or more deferred activities (i.e., activities that are associated with the user U and that have a state of "deferred"). It may be desirable for the user U to perform such interrupted and/or deferred activities at a later time. There is a risk, however, that the user U will not remember to perform such interrupted and/or deferred activities. Embodiments of the present invention may address this problem in a variety of ways and thereby decrease the likelihood that the user U will fail to perform interrupted and/or deferred activities. Such embodiments are particularly useful in situations in which it is desirable or necessary for the user U to perform interrupted and/or deferred activities at some point in time, even if not immediately upon the occurrence of the first opportunity for the user U to perform such activities.

Figure 6:
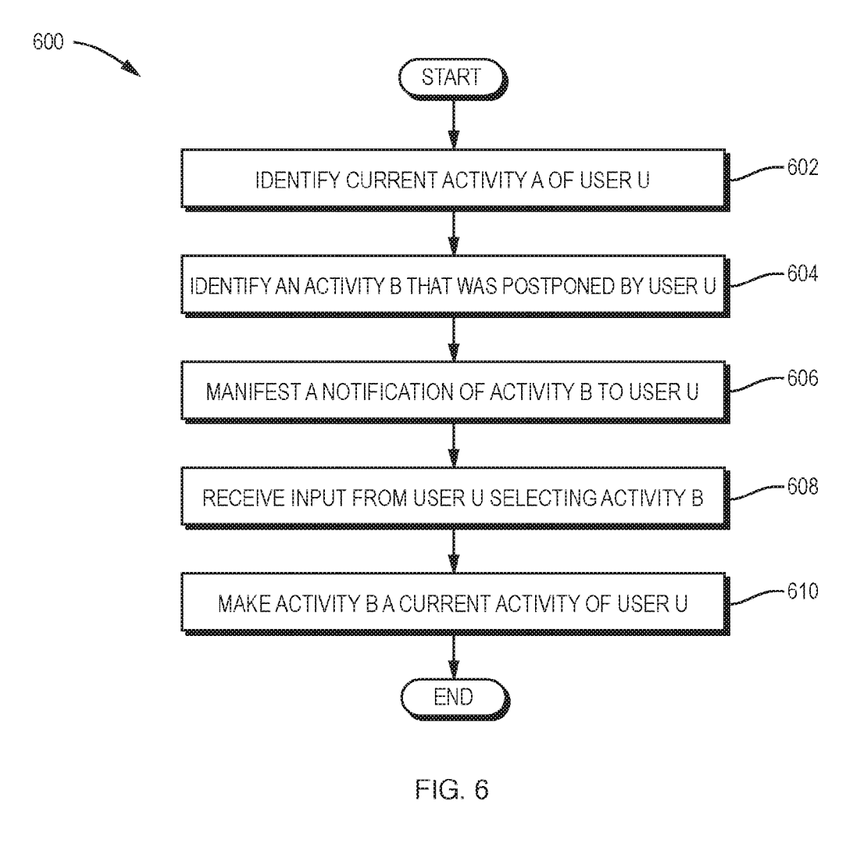
FIG. 6 is a flowchart of a method performed by the system of FIG. 2 for facilitating the process of enabling a user to perform tasks associated with the user that previously were interrupted or deferred according to one embodiment of the present invention.

Referring to FIG. 6, a flowchart is shown of a method 600 performed by the system 200 for facilitating the process of enabling the user U to perform tasks associated with user U that previously were interrupted or deferred according to one embodiment of the present invention. The activity management module 206 identifies a current activity A of user U (operation 602), such as by identifying an activity (e.g., the only activity) in the activity repository 202 that is associated with user U (e.g., whose user field 402e specifies user U) and whose state field 402f has a value of "active."

The term "postponed" will be used herein to mean "interrupted and/or deferred." The activity management module 206 identifies an activity B that previously was postponed by current activity A (FIG. 6, operation 604). The activity management module 206 may perform operation 604 in any of a variety of ways. For example, the activity repository 202 may contain data that identifies, for any particular activity A: (1) for any particular postponed activity, whether that activity was postponed by activity A (i.e., whether the particular postponed activity was marked as postponed in response to marking activity A as active); and/or (2) which activities activity A has postponed (i.e., which postponed activities were marked as postponed in response to marking activity A as active). Such data may be stored, for example, in the state field 402f of activity A and/or the state field 402f of the activities postponed by activity A. The activity management module 206 may store such data during method 300 of FIG. 3. For example, if the user U chooses (in operation 314) not to continue engaging in the current activity A, then the activity management module 206 may (in addition to operations 318-322):

store, in the state field 402f of current activity A, an identifier of interrupting activity B and optionally one or more of the following: (1) an indication that interruption (rather than deferral) was the reason for postponement of activity A; (2) the current time; and (3) a reminder condition associated with activity A; and/or
 store, in the state field 402f of interrupting activity B, an identifier of current (interrupted) activity A and optionally one or more of the following: (1) an indication that interruption (rather than deferral) was the reason for postponement of activity A; (2) the current time; and (3) a reminder condition associated with activity A.

Similarly, if the user U chooses (in operation 314) to continue engaging in the current activity A, then the activity management module 206 may (in addition to operation 316):

store, in the state field 402f of current activity A, an identifier of interrupting activity B and optionally one or more of the following: (1) an indication that deferral (rather than interruption) was the reason for postponement of activity B; (2) the current time; and (3) a reminder condition associated with activity B; and/or
 store, in the state field 402f of interrupting activity B, an identifier of current activity A and optionally one or more of the following: (1) an indication that deferral (rather than interruption) was the reason for postponement of activity B; (2) the current time; and (3) a reminder condition associated with activity B.

A "reminder condition" for a particular activity is a condition, the satisfaction of which causes the activity management module 206 either to: (1) generate a reminder to a user to engage in the particular activity (e.g., as described below in connection with operation 606); or (2) automatically make the activity a current activity of a user. A reminder condition is an example of a "condition," as that term is used herein and may, therefore, be a simple condition (i.e., a condition which does not contain any sub-conditions) or a complex condition (e.g., a condition which contains two or more simple or complex conditions conjoined by Boolean operators). The activity management module 206 may select the reminder condition to store in association with a particular postponed activity in any of a variety of ways, such as by: (1) receiving input from a user specifying the reminder condition and selecting the reminder condition based on the user input; (2) selecting the reminder condition as a predetermined reminder condition associated with the type 402b of the postponed activity, where different types may be associated with different reminder conditions; or (3) selecting the reminder condition as a function of the contexts 102 of one or more users.

The activity management module 206 may perform operation 604 in response to any of a variety of inputs. For example, the activity management module 206 may perform operation 604 in response to:

input provided by the user U (e.g., user 204a) requesting that the activity management module 206 inform the user U of one or more postponed activities associated with user U;
 a determination by the activity management module 206 that a current activity A (e.g., the only current activity) of user U has been completed (e.g., that the value of the state field 402f of activity A has been changed to "complete") or postponed;
 a determination by the activity management module 206 that an activity which is not a current activity of user U has been completed or postponed;
 a determination by the activity management module 206 that user U has no current activity;
 a determination that the current time (e.g., as indicated by time sensor 106a) satisfies a particular condition, e.g.:
  the current time is equal to a particular predetermined time of day (e.g., 9 am or 5 pm);
  the current time is equal to a particular predetermined time of day on a particular calendar date (e.g., 9:00 am on Mar. 1, 2013);
  the current time satisfies a particular periodic condition, such as a condition that is satisfied every minute, every ten minutes, every hour, every day, or every week;

the current time satisfies a reminder condition associated with activity B;

a determination that the current activity A postponed another activity (e.g., activity B) at least some predetermined amount of time earlier than the current time (e.g., one minute, ten minutes, one hour, one day, or one week);

a determination that activity B was postponed by activity A at least some predetermined amount of time earlier than the current time (e.g., one minute, ten minutes, one hour, one day, or one week);

a determination that a particular event (such as the commencement of an airplane takeoff or the commencement of a surgery) has occurred, is about to occur, or has been detected;

a determination that the state of an activity (e.g., a current activity of user U) has changed in any way or in some predetermined way (e.g., that the state of a particular specified checkbox has changed to "complete" from some other state);

a determination that a reminder condition associated with activity B has been satisfied;

a determination that any other condition disclosed herein is satisfied by the context 102 of user U and/or the contexts 102 of other users.

Any of the determined conditions described in the above list may be used as reminder conditions associated with postponed activities.

The activity management module 206 may identify activities in addition to activity B in operation 604. For example, in operation 604, the activity management module 206 may identify: (1) some or all interrupted activities that were interrupted by activity A; and/or (2) some or all deferred activities that were deferred by activity A. Therefore, any reference in FIG. 6 and the description thereof to activity B should be understood to refer equally to any and all activities identified by the activity management module 206 in operation 604.

The activity management module 206 manifests activity B to user U, thereby providing a manifestation 218 of activity B to user U (FIG. 6, operation 606). For example, the activity management module 206 may display a message (e.g., in a pop-up window) to the user U, indicating that activity B previously was postponed by activity A, and optionally indicating additional information, such as the type, name, and/or description of activity B, the reason for postponement (e.g., interruption or deferral) and the time of postponement. Such a message may also prompt user U to select whether to continue engaging in activity A or to switch to activity B, and include means for enabling the user to make such a selection (such as a button labeled "Continue with Activity A" and a button labeled "Switch to Activity B").

In response to the manifestation 218, the user U may provide input to the activity management module 206 indicating either that the user U wishes to continue engaging in activity A or that the user U wishes to switch to activity B. For purposes of example and ease of illustration, in the method 600 the user U provides input to the activity management module 206 selecting activity B (i.e., indicating that the user U wishes to engage in activity B) (FIG. 6, operation 608). Such input may take any of a variety of forms, such as tapping or clicking on a graphical user interface element (e.g., the button mentioned above labeled "Switch to Activity B" or a manifestation of activity B in a manifestation of a plurality of activities postponed by activity A, such as a table or list of such postponed activities).

In response, the activity management module 206 makes activity B a current activity of user U (FIG. 6, operation 610), such as by performing operations 318-322 of FIG. 3. The method 600 may infer that user U wishes to continuing engaging in activity A if, for example, the user U fails to provide any input in response to the manifestation 218 within some predetermined amount of time after manifesting the manifestation 218 (e.g., 10 seconds, 30 seconds, 1 minute, 5 minutes, or 10 minutes).

The method 600 need not perform operation 606 (generating the manifestation 218) or operation 608 (receiving input from the user U). For example, the activity management module 206 may automatically cause activity B to become a current activity of user U (e.g., perform operation 610), without receiving a selection or other confirmation of such a switch from the user U.

When an activity is interrupted, the activity management module 206 may store (e.g., in the state field 402f of the interrupted activity) additional data relating to the state of the interrupted activity to make it easier for the user to return to engaging in the interrupted activity later. For example, the activity management module 206 (e.g., in operations 318 and 610) may store, in the state field 402f of the activity data record representing the interrupted activity A, data representing any one or more of the following: (1) the action in the activity currently being performed by the user U (e.g., the checkbox in an electronic checklist currently being processed by the user U but not yet marked as completed by the user U); (2) the actions in the activity that have already been performed by the user U (e.g., the checkboxes in an electronic checklist that the user U has already marked as completed).

When the user U subsequently returns to engaging in the interrupted activity A, the activity management module 206 may provide output to the user U to assist the user U in completing the interrupted activity A (now current activity A). For example, the activity management module 206 may provide output to the user U indicating either or both of: (1) the action that the user U was in the act of performing in activity A when the user U was interrupted; (2) the actions in activity A that were already performed by the user U. The activity management module 206 may generate such output based on the information previously saved in the state field 402f of the activity A. Such output may take any of a variety of forms, such as a message reminding the user to "Continue performing the procedure beginning at step 7" (where step 7 is the step during which the user U previously was interrupted), or by circling or otherwise emphasizing the checkbox in a checklist that the user was processing when the user U previously was interrupted.

When any particular activity A is a current activity of the user U, the activity repository 202 may contain data that indicates which of the postponed activities (i.e., activities having a state of "interrupted" or "deferred") represented by the activity data records 202a-n were postponed by activity A, whether each such activity was interrupted by activity A or deferred by activity A, and the times at which such activities were interrupted or deferred by activity A. The activity management module 206 may use such data to identify an order of such interrupted/deferred activities relative to activity A, such as an ascending order of the times at which the postponed activities were postponed by activity A, or a descending order of the times at which the postponed activities were postponed by activity A. The activity management module 206 may manifest such postponed activities to the user U (e.g., in operation 606) in the identified order, such as by manifesting the postponed activities in a spatial order (e.g., top to bottom or left to right) or a temporal order (e.g., one at a time) corresponding to the order identified by the activity management module 206. The activity management module 206 may enable the user U to provide manual input specifying modifications to this order, in response to which the activity management module 206 may change the order based on user U's manual input.

When ordering postponed activities, the activity management module 206 may, for example, give priority to interrupted activities over deferred activities. For example, the activity management module 206 may sort all of the interrupted activities that were interrupted by a particular activity A to create a sorted list of such activities, and sort all of the deferred activities that were deferred by a particular activity A to create a sorted list of such activities. The activity management module 206 may combine such lists together to create a unified list of postponed activities that were postponed by activity A by concatenating the sorted list of interrupted activities with the sorted list of deferred activities, so that the resulting concatenated list contains the sorted list of interrupted activities followed by the sorted list of deferred activities. Alternatively, for example, the activity management module 206 may give priority to deferred activities over interrupted activities, and apply the techniques just described accordingly.

When a current activity A of a user U is marked as complete, embodiments of the present invention may detect such completion and, in response to such detection, either automatically make a postponed activity that previously was postponed by activity A into a current activity (e.g., the only current activity) of user A, or prompt the user U to select one such postponed activity to become a current activity (e.g., the only current activity) of user U. For example, the activity management module 206 may perform operation 604 (and subsequent operations 606-610) in response to determining that current activity A of user U has been marked as complete (e.g., that the state field 402f of current activity A has changed from some value to "complete"). For example, in operation 604, the activity management module 206 may identify the activity that was postponed most recently by activity A. If only one postponed activity was postponed by activity A, then in operation 604 the activity management module 206 may identify the sole postponed activity that was postponed by activity A. Such embodiments enable the user U to postpone a first activity to perform a second activity, to perform and complete the second activity, and then to return to the first (postponed) activity quickly and easily.

Another advantage of embodiments of the present invention is that they may be used to track and respond to changes in the activities performed by users in real-time. For example, any one or more of the activity input 208, the interruption input 210, and the completion input 216 may be provided to the activity management module 206 in any of the manners disclosed herein in connection with the context data 102. In fact, one or more of the activity input 208, the interruption input 210, and the completion input 216 may be contained within or constitute the context data 102. Such inputs 208, 210, and 216 may, therefore, be provided to the activity management module 206 periodically at any period (e.g., every second, every 5 seconds, every 10 seconds, every minute, every 10 minutes, or every hour) and/or in response to sensor output that causes a change in one or more of such inputs 208, 210, and 216. As a result, the inputs 208, 210, and 216 may provide data to the activity management module 206 that indicates one or both of: (1) changes in the current activity or activities of users (e.g., a switch from one current activity to another current activity); and (2) changes in the states of activities (e.g., current and/or postponed activities).

The activity management module 206 may, therefore, determine, based on one or more of the inputs 208, 210, and 216 that a user U is now engaged in a particular activity A or that an opportunity exists for user U to engage in activity A, in real-time or after only a nominal amount of time has passed since the user U began to engage in activity A or after the opportunity to engage in activity A arose (e.g., after 1 second, 5 seconds, 10 seconds, 1 minute, or 10 minutes). In response to such a detection, the activity management module 206 may store (e.g., in the state field 402f of the activity data record representing activity A) data indicating one or more of the following: (1) the nature of the detected event (e.g., actual engagement by user U in an activity or potential engagement by user U in the activity); (2) an identifier of activity A; and (3) a time of the detection (or the time of the event, if available).

Similarly, the activity management module 206 may determine, based on one or more of the inputs 208, 210, and 216 that the state of a current activity of user U has changed (e.g., that the user U has checked off a box in an electronic checklist or performed such other action that is part of or otherwise associated with an activity) in real-time or after only a nominal amount of time has passed since the state changed (e.g., after 1 second, 5 seconds, 10 seconds, 1 minute, or 10 minutes). In response to such a detection, the activity management module 206 may store (e.g., in the state field 402f of the activity data record representing activity A) data indicating one or more of the following: (1) an identifier of the state that has changed (e.g., an identifier of the checkbox that was checked); (2) the current value of the changed state (e.g., "complete"); and (3) a time of the detection (or the time of the state change, if available).

Although certain portions of the description herein may refer to the context data 102 as being associated with a particular user, it should be understood that each of any of number of users (e.g., 1, 2, 3 or more users) may have its own associated context data 102. Therefore, any reference herein to context data 102 should be understood to include the context data 102 of a single user and the context data 102 of multiple users. Furthermore, context data 102 may include data obtained from any number of devices (e.g., 1, 2, 3 or more devices). For example, context data 102 may include data obtained from a plurality of devices used by one or more users in connection with a particular activity, such as a plurality of devices in an airplane cockpit that are used in connection with a preflight checklist procedure or a plurality of devices in an operating room that are used in connection with a surgical procedure. In general context data 102 may be any data, obtained from any device, which provides evidence that a particular user is or is not engaged in a particular activity at a particular time. Context data 102 may include additional data representing, for example, a particular action in the particular activity that the particular user is engaged in at the particular time.

The ability of embodiments of the present invention to detect changes in current activities of users and in the states of such activities provides a variety of benefits. For example, one deficiency in conventional task management software, such as software which enables users to store data records often referred to as "tasks" or "reminders" (such as Microsoft Outlook and Apple Reminders) is that such software cannot determine whether a user is engaged in performing an activity associated with a particular data record at any particular time, and also cannot determine whether the state of any such activity has changed. As a result, such software is incapable of determining whether an activity has been interrupted or whether an opportunity to interrupt an activity has been presented. Such software, therefore, is not capable of assisting in reminding the user to engage in interrupted activities. In contrast, embodiments of the present invention may be used to detect whether a user is performing a particular activity at a particular time and/or whether the state of a particular activity has changed. As a result, embodiments of the present invention are particularly useful for reducing the likelihood that an interrupted activity will not be completed, and for returning the user to the point of interruption.

Another advantage of embodiments of the present invention is that they provide an improvement over, and may be used in conjunction with, checklists and other forms of workflow process management. The value of checklists in improving processes, such as those performed by aircraft cockpit crews and surgical teams, has been well-documented, especially in connection with reducing the likelihood that critical steps are not performed. Checklists alone, however, are insufficient to protect against the full range of problems that can arise due to deficiencies in prospective memory (remembering to perform an action in the future). For example, in many real-world situations, individuals and teams must perform multiple procedures, each of which may be governed by a distinct corresponding checklist. Although such checklists may prove adequate in cases in which each checklist procedure is performed in sequence and without interruption, in many real-world scenarios a first procedure governed by a first checklist is interrupted, sometimes causing (and possibly requiring) the person or people performing the procedure to switch to performing a second procedure governed by a second checklist. In such a situation, the individual team members must remember to return to performing the first procedure. The checklists themselves are insufficient to provide the team members with a reminder to do so. Checklists, in other words, fail to address problems that can arise from the interactions among multiple checklists, especially those that arise from interruptions. Embodiments of the present invention address such problems by tracking the progress of each procedure as it is performed (e.g., by tracking which checkboxes are checked off in a checklist procedure), by providing reminders to return to interrupted procedures, and by assisting users in returning to the point of interruption when returning to an interrupted procedure.

One advantage of embodiments of the present invention is that they may be used to decrease the likelihood that a user who is interrupted while performing a particular activity, or who chooses to stop performing the particular activity midway to perform another activity, will forget to return to and complete the first (postponed) activity. In particular, embodiments of the present invention decrease this likelihood by enabling the user to obtain information about the user's postponed activities, and even to affirmatively and automatically remind the user of such postponed activities whether or not the user seeks out such information. Embodiments of the present invention are useful because all opportunities for a user to switch from one activity to another present a risk that the user will fail to return to an activity. For example, if the user is performing a current activity A and is presented with an opportunity to engage instead in current activity B, the user may either decline or accept the opportunity. In either case, however, the user's attention is diverted from performing current activity A to the activity of deciding whether to switch to engaging in activity B. In such a case, there are three risks: (1) that the user will continue to engage in activity A but will forget to engage later in activity B: (2) that the user will switch to engaging in activity B but will forget to return to engaging later in activity A; and (3) the user, distracted by the decision to engage in activity A or activity B, will fail to: (a) return from the decision to engaging in activity A: and/or (b) remember to engage later in activity B.

Embodiments of the present invention may be used to decrease the likelihood of all three such types of failure of prospective memory. Such embodiments are particularly useful when either or both of activity A and activity B are critical to perform, especially when either or both of activity A and B are critical to perform in a timely manner and/or when the harm potentially caused by failing to perform either or both of activity A and activity B is particularly great. Examples of environments in which embodiments of the present invention may be particularly useful are aviation, healthcare, and manufacturing.

Embodiments of the present invention may be used to protect against the risk of type (3) listed above in a variety of ways, such as the following. The activity management module 206 may, for example, treat the process of obtaining the user's activity selection input (e.g., inputs 214 and/or 220 in FIG. 2) itself as an activity, as that term is used herein. In particular, whenever the activity management module 206 prompts the user U to receive activity selection input or otherwise receives such input from the user U, the activity management module 206 may create and store, in the activity repository, an activity data record representing the activity of deciding whether to engage in an activity B (e.g., to switch to engaging in activity B from a current activity A). Such an activity is referred to herein as an "activity engagement" activity. The activity management module 206 may, for example, create such an activity data record:

after and in response to receiving the interruption input 308 (e.g., after operation 308 in the method 300 of FIG. 3);

before manifesting the notification 218 of activity B to user U (e.g., before operation 606 in the method 600 of FIG. 6).

Upon creating such an activity data record, the activity management module 206 may set the value of the state field 402*f* to "active" and change the value of the state field 402*f* of any of user U's current activities to "interrupted" to indicate that such current activities have been interrupted, even temporarily, by the activity of deciding whether to continue engaging in those current activities or to switch to activity B.

The activity management module 206 may store, in the type field 402*b* of an activity engagement activity data record, a value such as "activity engagement" that indicates that the activity data record represents an activity of deciding whether to engage in a new activity. The activity management module 206 may store, in the state field 402*f* of an activity engagement activity data record, data representing the current activity or activities (if any) of user U and the activity B.

Once the user U has decided whether to switch to activity B (and, therefore, if applicable, whether to continue engaging in user A's current activities) the activity management module may perform a variety of actions. For example, if the user U chooses to continue engaging in the current activity or activities, then the activity management module 206 may (in addition to any other actions disclosed herein): (1) store a value of "completed" in the state field 402*f* of the activity engagement activity data record; and (2) store a value of "active" in the state field 402*f* of the activity data records of the user U's current activities.

As another example, if the user U chooses to engage in activity B, then the activity management module 206 may (in addition to any other actions disclosed herein) store a value of "completed" in the state field 402*f* of the activity engagement activity data record.

Any description herein that relates to activities and their corresponding activity data records in the activity repository 202 relates equally to activity engagement activities and their corresponding activity data records in the activity repository 202. For example, activity engagement activities may be interrupted and/or deferred, the activity management module 206 may prompt users to return to engagement in activity engagement activities, and users may choose to return to engagement in activity engagement activities after such activities have been postponed.

As described above, embodiments of the present invention may automatically remind a user to engage in a postponed activity. Providing such reminders to the user, however, poses a risk that such reminders will exacerbate the very problem that they are intended to solve, namely that of limiting the ability of interruptions to cause the user to fail to remember to engage in a task, because the reminders themselves are interruptions that may cause the user to forget to engage in the task that the user was performing when the reminder was generated, the task that is the subject of the reminder, or both. Embodiments of the present invention address this problem in a variety of ways. For example, as described above, embodiments of the present invention may treat reminders as activities, and thereby track and remind the user of the activity that was interrupted by the reminder if the user subsequently fails to engage in the interrupted activity after attending to the reminder. As another example, embodiments of the present invention may limit the conditions under which reminders are provided to the user, in ways that are designed to balance the impact of such reminders on the ability of the user to complete other activities against the harm that could result from the user's failure to attend to postponed activities. For example, embodiments of the present invention may generate certain reminders upon the user's completion of another activity, thereby eliminating the possibility that such reminders will interrupt that activity. As another example, embodiments of the present invention may generate certain reminders upon the detection of a certain event (e.g., a critical event such as the takeoff of an airplane or the commencement of a surgical procedure), based on the premise that the benefits of interrupting the user with a reminder at such a critical time outweighs the potential harm that could result from interrupting the user at that time. In both such examples, embodiments of the present invention limit the extent to which reminders are provided to the user when the benefits outweigh the harms of doing so.

As described herein, in some circumstances the activity management module 206 may determine automatically that a user U has switched from performing a current activity A to performing some other activity B. In some circumstances, however, the activity management module 206 may not make such a determination. For example, if the current activity A is processing of an electronic checklist using a laptop computer, and the user leaves the laptop computer to engage in another activity that does not involve use of the laptop computer, the activity management module 206 may not be capable of determining that user U is now engaged in activity B. Embodiments of the present invention may, however, still provide various benefits in such situations.

For example, if the activity data record of a particular activity A indicates that user U currently is engaged in activity A, and the context data 102 of user U satisfies some predetermined condition, the activity management module 206 may determine that the context data 102 satisfies the predetermined condition and, in response, the activity management module 206 may take any of a variety of actions. An example of such a condition is at least some predetermined minimum amount of time (e.g., 10 seconds, 30 seconds, 1 minute, 5 minutes, 10 minutes, or 1 hour) lapsing without user U providing any input in connection with activity A (e.g., checking any checkbox in a checklist), or without any change in the state of activity A (e.g., any change in the state of any checkbox in a checklist). Examples of actions that the activity management module 206 may take in response to determining that such a predetermined condition is satisfied are: (1) prompting the user U to provide input verifying that the user U is still engaged in activity A, and marking activity A as interrupted if the user fails to provide such input; and (2) automatically marking activity A as interrupted. As these examples illustrate, the activity management module 206 may use any of a variety of techniques to determine, based on the context data 102, that the user U is no longer engaged in a current activity A of user U and, in response to the determination, the activity management module 206 may mark activity A as interrupted or otherwise postponed, whether or not the activity management module 206 marks another activity of user U as active. One possible outcome in such a scenario, therefore, is for the activity management module 206 to mark the activity A as postponed and for user U to have no current activity as a result.

Another benefit of embodiments of the present invention is that they may be used to assist the user in focusing on engaging in one activity at a time. For example, in response to determining that a particular user U is associated with a particular active activity A (i.e., that activity A is a current activity of user U), the activity management module 206 may manifest to the user U a notification of activity A, such as any one or more of the type 402*b*, name 402*c*, and description 402*d* of activity A (such as a message stating that "Currently you are completing the pre-flight takeoff checklist for flight #4720M"). Furthermore, by keeping track automatically of user U's postponed tasks, embodiments of the present invention may provide user U with confidence that he or she will be able to return to such tasks later, and thereby decrease the likelihood that user U will feel the need to perform such tasks immediately in an effort to avoid forgetting to engage in them later.

Another advantage of embodiments of the present invention is that they may be used in connection with activities that are not limited to activities solely involving a single user or the use of a single computing device, software application, or communication mode. For example, embodiments of the present invention may be used in connection with activities having one or more of the following features:

- activities that involve the use, by one or more users, of a single computing device;
- activities that involve the use, by one or more users, of multiple computing devices;
- activities that involve the use, by one or more users, of a single software application;
- activities that involve the use, by one or more users, of multiple software applications;
- activities that involve the use, by one or more users, of a single communication mode;

activities that involve the use, by one or more users, of multiple communication modes; and activities that involve actions performed, by one or more users, without the use of any computing device.

Any particular activity represented by one of the activity data records 202a-n may have any individual feature or combination of features listed above. Different ones of the activity data records 202a-n may represent activities having different features or combinations of features listed above. For example, one such activity may solely involve the use of a first computing device, while another such activity may solely involve the use of a second computing device that differs from the first computing device. As another example, one such activity may solely involve the use of a first software application, while another such activity may solely involve the use of a second software application that differs from the first software application. As another example, one such activity may solely involve the use of a first communication mode, while another such activity may solely involve the use of a second communication mode that differs from the first communication mode.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more non-transitory computer-readable media, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Terms such as "computer," "computing device," and "communication device," as used herein refer, for example, to desktop computers, laptop computers, cellular telephones and smartphones, personal digital assistants (PDAs), and tablet computers.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

The invention claimed is:

1. A method performed by at least one computer processor of a computing device executing computer program instructions stored on at least one non-transitory computer-readable medium, the method comprising:

(A) modifying, by an activity management module executing on the computing device, a value of at least one state field in an activity data record of a postponed activity associated with a user of the computing device to indicate that the state of the postponed activity is postponed;

(B) storing, by the activity management module, a reminder condition for the postponed activity in the at least one state field of the activity data record of the postponed activity;

(C) identifying, by the activity management module, that a current activity of the user of the computing device is being performed;

(D) identifying, by the activity management module, the postponed activity associated with the user of the computing device based on a priority of the postponed activity;

(E) manifesting, by the activity management module, a notification of the postponed activity to the user responsive to determining that the reminder condition has been satisfied, wherein determining that the reminder condition has been satisfied comprises determining that a value of at least one state field of an activity data record of the current activity of the user of the computing device has changed, and wherein the notification of the postponed activity includes information reminding the user of the computing device of the last action performed prior to the postponed activity being postponed;

(F) receiving, by the activity management module, input from the user of the computing device selecting the postponed activity;

(G) modifying, by the activity management module, the value of the at least one state field of the activity data record of the postponed activity to active indicating that the user is currently engaged in the postponed activity responsive to receiving the input from the user selecting the postponed activity.

2. The method of claim 1, wherein (C) comprises:
(C) (1) receiving, by the activity management module, activity input;
(C) (2) determining, by the activity management module, responsive to the received activity input, that the user of the computing device is engaged in the current activity; and
(C) (3) modifying, by the activity management module, the value of the at least one state field of the activity data record of the current activity to active indicating that the user is engaged in the current activity.

3. The method of claim 1, wherein (E) comprises manifesting the notification responsive to determining that the current activity has been completed.

4. The method of claim 1, wherein (E) comprises manifesting the notification responsive to determining that the current activity has been postponed.

5. The method of claim 1, wherein (E) comprises manifesting the notification responsive to determining that the first current activity has been interrupted.

6. The method of claim 1, further comprising before (A):
(H) receiving, by the activity management module, interruption input from the current activity; and
(I) receiving, by the activity management module, activity selection input from the user indicating a selection of the first current activity to perform.

7. The method of claim 1, wherein (D) comprises determining, by the activity management module, using activity data indicating the user is responding to a communication from the current activity, that the user is engaged in the current activity.

8. A system comprising at least one computer processor of a computing device and at least one non-transitory computer-readable medium containing computer program instructions, wherein the computer program instructions are executable by the at least one computer processor to perform a method, the method comprising:
(A) modifying, by an activity management module executing on the computing device, a value of at least one state field in an activity data record of a postponed activity associated with a user of the computing device to indicate that the state of the postponed activity is postponed;
(B) storing, by the activity management module, a reminder condition for the postponed activity in the at least one state field of the activity data record of the postponed activity;
(C) identifying, by the activity management module, that a current activity of the user of the computing device is being performed;
(D) identifying, by the activity management module, the postponed activity associated with the user of the computing device based on a priority of the postponed activity;

(E) manifesting, by the activity management module, a notification of the postponed activity to the user responsive to determining that the reminder condition has been satisfied, wherein determining that the reminder condition has been satisfied comprises determining that a value of at least one state field of an activity data record of the current activity of the user of the computing device has changed, and wherein the notification of the postponed activity includes information reminding the user of the computing device of the last action performed prior to the postponed activity being postponed;
(F) receiving, by the activity management module, input from the user of the computing device selecting the postponed activity;
(G) modifying, by the activity management module, the value of the at least one state field of the activity data record of the postponed activity to active indicating that the user is currently engaged in the postponed activity responsive to receiving the input from the user selecting the postponed activity.

9. The system of claim 8, wherein (C) comprises:
(C) (1) receiving, by the activity management module, activity input;
(C) (2) determining, by the activity management module, responsive to the received activity input, that the user of the computing device is engaged in the current activity; and
(C) (3) modifying, by the activity management module, the value of the at least one state field of the activity data record of the current activity to active indicating that the user is engaged in the current activity.

10. The system of claim 8, wherein (E) comprises manifesting the notification responsive to determining that the current activity has been completed.

11. The system of claim 8, wherein (E) comprises manifesting the notification responsive to determining that the current activity has been postponed.

12. The system of claim 8, wherein (E) comprises manifesting the notification responsive to determining that the current activity has been interrupted.

13. The system of claim 8, wherein the method further comprises before (A):
(H) receiving, by the activity management module, interruption input from the fir current activity; and
(I) receiving, by the activity management module, activity selection input from the user indicating a selection of the current activity to perform.

14. The system of claim 8, wherein (D) comprises determining, by the activity management module, using activity data indicating the user is responding to a communication from the current activity, that the user is engaged in the current activity.

* * * * *